United States Patent [19]

George

[11] Patent Number: 5,130,615
[45] Date of Patent: Jul. 14, 1992

[54] TELEVISION APPARATUS HAVING KINESCOPE SPOT BURN PROTECTION CIRCUIT WITH EXTENDED GRID CUT-OFF TIME CONSTANT

[75] Inventor: John B. George, Carmel, Ind.

[73] Assignee: Thomson Consumer Electronics, Inc., Indianapolis, Ind.

[21] Appl. No.: 722,337

[22] Filed: Jul. 1, 1991

[51] Int. Cl.$^5$ .............. G09G 1/04; H01J 29/52; H04N 5/30
[52] U.S. Cl. ..................... 315/381; 358/220
[58] Field of Search ............ 315/381, 384, 386; 358/220

[56] References Cited

U.S. PATENT DOCUMENTS

| | | | |
|---|---|---|---|
| 3,946,275 | 3/1976 | Marino | 315/383 |
| 4,056,758 | 11/1977 | Schaas | 315/381 |
| 4,340,910 | 7/1982 | Valdez | 358/243 |
| 4,488,181 | 12/1984 | Haferl | 358/220 |
| 5,036,257 | 7/1991 | Norman et al. | 315/381 |
| 5,043,639 | 8/1991 | Gurley et al. | 315/386 |

Primary Examiner—Gregory C. Issing
Attorney, Agent, or Firm—Joseph S. Tripoli; Peter M. Emanuel; Richard G. Coalter

[57] ABSTRACT

A source of switched supply voltage is applied to a potential divider and coupled to an output terminal via a capacitor. An output tap of the potential divider is coupled to the output terminal via the conduction path of a grounded base transistor. In operation the transistor (1) operates in an inverted mode for initially charging the capacitor, (2) operates in either a normal or an inverted mode for regulating a grid bias voltage at said output terminal for grid current flow of either direction relative to the output terminal and (3) operates in an isolation mode upon removal of the switched supply voltage whereby the capacitor applies a negative grid cut-off bias to the output terminal, said transistor in said isolation mode preventing discharge of the capacitor thereby providing a grid cut-off bias at said output terminal having an extended cut-off time constant due to the lack of any discharge path for the capacitor other than leakage.

6 Claims, 3 Drawing Sheets

TELEVISION APPARATUS HAVING KINESCOPE SPOT BURN PROTECTION CIRCUIT WITH EXTENDED GRID CUT-OFF TIME CONSTANT

FIELD OF THE INVENTION

This invention relates to kinescope spot burn protection circuits and particularly to protection circuitry of a type which applies a positive grid bias to a kinescope during normal operation and applies a negative bias to the grid for blanking the kinescope electron beam upon occurrence of a scan loss condition to prevent spot burn of the kinescope phosphor.

BACKGROUND OF THE INVENTION

Direct view and projection display systems conventionally employ kinescopes as display devices. In normal operation of a kinescope an electron beam is deflected by scanning circuitry to produce a relatively large area raster on the face plate of the kinescope and video modulation of the beam produces a visible picture by activating phosphors deposited on the face plate. The beam energy in normal operation is therefore distributed over the whole area of the kinescope face plate. If scan loss should occur, this energy may be concentrated in a relatively small area and this high concentration of energy may produce permanent damage to the phosphor. This condition is commonly referred to as a kinescope "spot burn". Scan loss may occur during initial turn-on of a receiver or monitor under so-called "hot start"conditions. It may also occur during turn-off and it may also occur during normal operation of the kinescope due, for example, to a component failure.

It is known, generally, protect against scan loss by detecting or "predicting" the scan loss occurrence and, in response to the detected or predicted occurrence, to apply a negative grid bias to the kinescope of a value sufficient to blank or cut-off the electron beam. Circuits which control the grid bias and provide beam cut-off are sometimes referred to as so-called "grid kicker" circuits. Such circuits generally employ a capacitor which is charged to a relatively high voltage during normal kinescope operation. During scan loss conditions, the positive plate of the capacitor is clamped to ground to generate a high negative voltage that is applied to the kinescope grid for blanking the beam.

An example of spot burn protection by the grid cut-off technique is described by Valdes U.S. Pat. No. 4,340,910 entitled CRT SPOT SUPPRESSION CIRCUIT which issued Jul. 20, 1982. In this circuit, a scan indicating signal is applied via a parallel resistor and capacitor to the anode of a PN diode and to the control grid of a kinescope. The cathode of the diode is grounded. In operation, the scan indicating signal charges the capacitor and a portion of the signal flows through the parallel connected resistor to develop a positive grid bias voltage across the PN diode of about 0.6 volts. Upon scan loss, the reduction in scan indicating voltage is coupled via the charged capacitor to the diode thereby reverse biasing the diode and driving the kinescope grid negative to achieve grid cut-off thereby preventing spot burn of the kinescope.

Another example of a "grid kicker" circuit is described by Haferl in U.S. Pat. No. 4,488,181 entitled ELECTRON BEAM SUPPRESSION CIRCUIT FOR A TELEVISION RECEIVER which issued Dec. 11, 1984. In this example a "grid kicker " circuit is activated in a remotely controlled receiver upon switching between normal and standby receiver operating modes to thereby blank the kinescope prior to disablement of the receiver scanning circuits. In a specific embodiment of the Haferl apparatus the grid bias control circuit comprises a capacitor having a first plate connected to a charging source and having a second plate connected to the kinescope grid and coupled to ground via a PN diode. In normal operation the capacitor is charged by the charging source and a resistor in parallel with the capacitor applies forward bias to the diode thereby establishing a positive grid bias voltage for the kinescope of about 0.6 volts. Grid blocking is provided by a clamp transistor which clamps the first plate of the capacitor to ground in response to the turn-off (i.e., stand-by operating mode) command produced by the remote control unit. Accordingly, the diode is reverse biased and the kinescope grid is driven to a negative potential.

In the foregoing examples of grid bias control circuits the grid was biased at relatively modest positive potential provided by a forward biased PN diode during normal operation. This is the usual bias condition for kinescopes having cathodes driven by amplifiers capable of driving the cathode to nearly ground potential. Not all amplifiers have this capability. For example, certain cascode cathode driver amplifiers have an inherent limitation in the minimum output voltage they can produce. In order to achieve maximum brightness during normal kinescope operation it is necessary to provide a grid bias of several volts (e.g., 25 volts) and grid bias control circuits meeting this need have been developed.

A first example of a grid bias control circuit providing a predetermined positive grid voltage during normal operation is described by Gurley and Wignot in allowed U.S. patent application Ser. No. 515,512 entitled VIDEO DISPLAY APPARATUS WITH KINESCOPE SPOT BURN PROTECTION CIRCUIT which was filed Apr. 30, 1990, and is incorporated herein by reference. The Gurley and Wignot circuit is similar to those previously discussed but includes a potential divider network coupled between a source of high voltage and ground and having an output coupled to the kinescope grid. The network elements are selected to bias the grid at about 25 volts during normal operation. The network also includes a Zener diode having a break-down voltage of about 27 volts which clamps the grid voltage to that value at the end of a scan loss interval to prevent the charging current supplied to the capacitor from producing excessive positive grid bias. Advantageously, the Zener diode is biased off during normal operation to thereby prevent production of radio frequency interference (RFI) which otherwise may occur due to flow of current through the Zener diode.

Another example of a grid bias control circuit featuring potential divider control of the positive grid bias voltage and Zener diode limiting is described by Normal et al. in allowed U.S. patent application Ser. No. 516,385 entitled PROJECTION TV DEFLECTION LOSS PROTECTION CIRCUIT which was filed Apr. 30, 1990 and is incorporated herein by reference. In an embodiment of a projection television receiver they disclose the scan loss indication signal is obtained by a detector responsive to horizontal scanning pulses for controlling a high voltage PNP switching transistor. During normal operation, when the pulses are present, the transistor is turned on thereby supplying charging current to a "grid kicker" capacitor and supplying operating voltage to a potential divider network that biases the grid to a positive value of about 25 volts. When the horizontal sweep pulses are absent, the switching transistor turns off and a "pull down" resistor grounds the positive plate of the capacitor thereby driving the grid negative. In the specific example shown of the grid bias control circuit one resistor of the potential divider is connected in parallel with the capacitor. This connection determines the RC time constant for the negative output pulse produced by the circuit. For the specific circuit values given (e.g., 2.7 meg-Ohms and 4.7 micro-Farads), the time constant is about 12.7 seconds.

SUMMARY OF THE INVENTION

The foregoing examples of grid bias control circuits all provide excellent performance. The present invention resides, in part, in the recognition that in all four of the examples discussed above a need exists for improvement in a single parameter common to all four of the examples. That parameter, in accordance with the invention, is the grid cut-off time constant. The grid cut-off time constant, as used herein, means the length of time that a negative grid blocking voltage may be sustained in response to a beam blanking control signal supplied to the grid bias control circuit.

In each of the foregoing examples, the grid cut-off time constant is determined by what will herein be called "real" circuit elements as distinguished from unintended circuits elements such as parasitic leakage paths. It is easy to distinguish "real" elements from parasitic elements, "real" elements cost money and show on a circuit diagram, unintended circuit elements (leakage paths and parasitic capacitance) are not something that you would pay money for and, generally speaking, they are not illustrated in circuit diagrams. They just don't appear on a parts list.

With the foregoing in mind, the prior art examples all employ a capacitor and at least one resistor providing a discharge path for the capacitor. In the first and second examples the resistor and capacitor are connected in parallel. In the third and fourth examples the capacitor is provided with a discharge path through at least one resistor of the potential divider network. In the last example discussed the grid blocking time constant was 12.74 seconds with the element values disclosed. The time constants for the other examples are all determined by "real" element values (as defined above) and are thus limited by practical circuit values to a few tens of seconds.

In accordance with the present invention there is no "real" circuit element included which will discharge the "grid kicker" capacitor. Any discharge which occurs will result only from leakage paths. Accordingly, the grid cut-off time constant is extended from seconds to minutes using practical circuit element values and typical element leakage values.

In view of the foregoing, the present invention is directed to meeting the need for a grid bias control circuit having an extended grid cut-off time constant.

An extended grid bias cut-off time constant can not be achieved in the prior art circuits because of practical limitations of the element values. If, for example, the capacitor size (e.g., 4.7 micro-Farads) were significantly increased there would be correspondingly increased costs involved. Also, there are practical limits on the physical size of components used in television receivers and very large capacitors require special mounting brackets (clamps).

The present invention solves the problems of extension of grid bias cut-off time constant by eliminating "real" circuit elements which would provide a discharge path for the "grid kicker" capacitor. With no discharge path, the time constant is limited only by leakage current paths and, as noted above, is greatly extended to several minutes using the same value of capacitor as in the prior art circuits.

The difficulty in implementing the present invention is the problem of eliminating the discharge path present in the prior art circuits without loss of any of the other functions of the grid bias control circuit. In accordance with an aspect of the invention, this is achieved by operating a transistor in a "normal" mode during some operating conditions of the grid bias control circuit and operating the transistor in an "inverted" mode during other operating conditions of the grid bias control circuit.

As used herein, the "normal" mode of operation of a transistor comprises forward biasing the base-emitter junction and reverse biasing the collector-base junction of the transistor. The term "inverted" mode of operation of a transistor means forward biasing the collector-base junction and reverse biasing the base-emitter junction. In the normal mode, a transistor will exhibit a specific value of "beta", "Hfe" or "forward" current gain. In the "inverted" mode the current gain will be lower. This effect may be due, for example, to differences in the collector/base and base/emitter junction areas or other physical characteristics such as differences in junction widths.

However, in the present invention it has been found that the current gain of a transistor operating in the inverted mode is adequate to meet the particular circuit requirements of the grid bias control circuit and it is by this means in the specific circuits herein described that it is possible to completely eliminate "real" discharge paths for the grid "kicker" capacitor as discussed in more detail later.

A grid bias control circuit for use with a kinescope, in accordance with the invention, comprises an input terminal coupled to a source of switched supply voltage and coupled via a pulse forming capacitor to an output terminal for producing at said output terminal a given positive grid bias voltage for said kinescope when said supply voltage is present and for producing a negative grid cut-off bias pulse at said output terminal upon termination of said supply voltage for blanking said kinescope. A potential divider is coupled between the input terminal and a source of ground potential and having an output node for providing the given positive grid bias voltage when the supply voltage is present and for providing a ground level output voltage upon termination of the supply voltage. A transistor is provided having a conduction path coupled between the output of the potential divider and the output of the grid bias control circuit, the transistor having a control electrode coupled to the source of ground potential, the grid bias control circuit having no discharge path for said pulse forming capacitor.

BRIEF DESCRIPTION OF THE DRAWING

The foregoing and additional features of the invention are shown in the accompanying drawing wherein like elements are denoted by like reference designators and in which.

DETAILED DESCRIPTION

Figure 1:
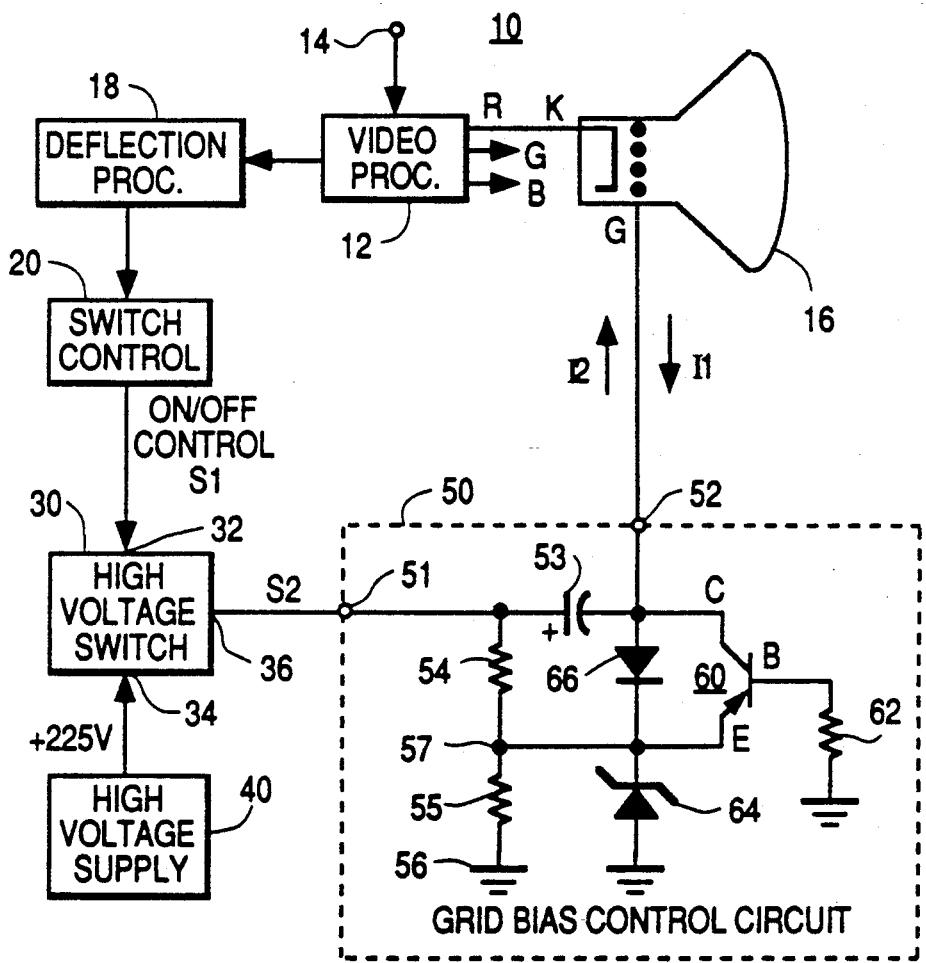
FIG. 1 is a block diagram, partially in schematic form, of a television receiver having a grid bias control circuit embodying the invention.

The television receiver 10 of FIG. 1 comprises a video processing unit 12 of conventional design having an input terminal 14 for receiving RF modulated or baseband video input signals and having outputs for providing red (R), blue (B) and green (G) output signals for display by a kinescope 16. The red (R) signal is applied to the cathode K of kinescope 16.

In order to simplify the drawing and the following explanation of the invention, the kinescope 16 is illustrated as having a single cathode, K. In practice, in direct view color TV systems, it may have three cathodes to which the R, G and B signals are applied. In a projection television system the R, G, and B signals would be applied to respective cathodes (K) of three projection kinescopes. In a monochrome system there would be a single cathode drive signal, Y, representing luminance signal levels. The present invention applies to monochrome and color TV display systems of either the direct view or the projection kind. In any one such application only one grid bias control circuit is required. For example, in direct view kinescopes the three grids may be internally connected and so only one grid bias control circuit can be used. In projection systems there are three separate kinescopes. For such a case one has the option of using a common grid bias control circuit or three separate circuits. For such applications it is preferred to use separate circuits as a matter of good engineering practice (e.g., the redundancy improves overall reliability). Only one such circuit is shown herein to simplify the drawing.

Deflection signals for kinescope 16 (or a plurality of kinescopes as in a color projection system) are provided by a deflection processing unit 18 that is coupled to receive synchronizing signals from video processing unit 12. Processor 18 may be of conventional design which generates vertical and horizontal sweep signals for the kinescope (or kinescopes) 16.

For spot burn protection, receiver 10 includes a switch control unit 20, coupled to deflection processing unit 18 and which provides an ON/OFF control signal S1. The switch control unit 20 may be of conventional design, as for example, those described in any one of the previously discussed spot burn protection circuits. It may, for example, comprise a circuit for detecting failure of a sweep signal or failure of a circuit component. Alternatively it may be "predictive" as previously described so as to blank the kinescope display before actual scan loss as in the "hot start" case previously described on it may provide grid blanking prior to switching from normal to "stand by" operating modes of the receiver. Of importance to the present invention is that the switch control unit 20 provide a suitable ON/OFF control signal S1 for controlling grid blanking of kinescope 16 at times when spot burn protection is desired.

The ON/OFF control signal S1 of switch control unit 20 is applied to the control input 32 of a high voltage switch 30 which has a supply input 34 coupled to receive a source of high voltage (e.g., +225 volts) provided by a high voltage supply 40. Switch 30 has an output 36 for providing a source of switched supply voltage to the input terminal 51 of a grid bias control circuit 50. The switched supply voltage (S2) is turned ON during normal operation of the receiver (or monitor) 10 and is turned OFF during periods when grid bias cut-off or blanking of the kinescope grid G is required.

Figure 3:
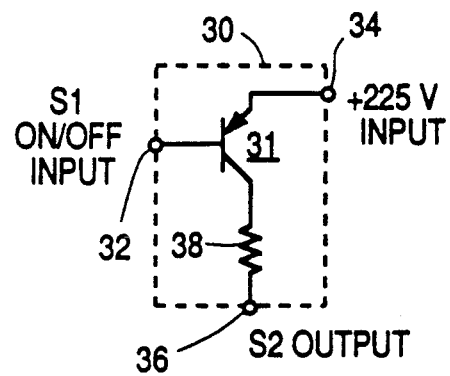
FIG. 3 and 4 illustrate series and shunt high voltage switches suitable for use in the receivers of FIGS. 1 or 2; and FIG. t illustrates a modification of the receiver of FIG. 2.
Figure 4:
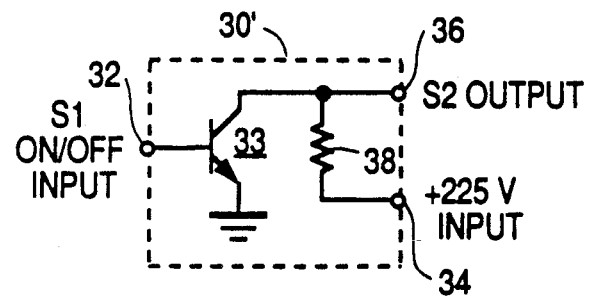

FIGS. 3 and 4 show suitable examples of the high voltage switch 30. In FIG. 3 the switch is of the series type comprising a PNP transistor 31 having a base electrode connected to control terminal 32, having an emitter electrode connected to terminal 34 for receiving the high voltage input and having a collector electrode coupled via a resistor 38 to the switch output terminal 36. When the switch is OFF terminal 326 is isolated from the high voltage supply 40. When the switch 30 is ON it couples the high voltage supply 40 to output 36 via resistor 38 and so exhibits a output impedance equal to the value of resistor 38. This resistor may be selected so as to limit the maximum output voltage to the grid bias generator 50 and thus limits the maximum charge on the grid kick capacitor as discussed later. In FIG. 4 the switch 30' is of the shunt type comprising an NPN transistor 33 having a base electrode connected to control terminal 32, having an emitter electrode connected to ground and having a collector electrode connected to output 36 and coupled to the high voltage supply 40 input terminal 34 by means of resistor 38. When turned ON, transistor 33 clamps the output to ground, otherwise, the output 36 is coupled to the input 34 via the resistor 38.

The remaining elements of the receiver 10 of FIG. 1 comprise a first example of a grid bias control circuit 50 embodying the invention. The general function of this circuit is to apply a positive bias to grid G of kinescope 16 during normal receiver operation and to apply a negative bias to grid G under conditions of actual or predicted scan loss. The more specific objective of the grid bias control circuit 50 is to provide a negative grid cut-off bias to kinescope 16 for extended periods of time (e.g., minutes as compared to seconds as the previously discussed examples of grid bias control circuits).

In accordance with the invention, the grid bias control circuit 50 in FIG. 1 comprises an input terminal 51 coupled to the source of switched supply voltage 30 and coupled via a pulse forming capacitor 53 to an output terminal 51 for producing at the output terminal a given positive grid bias voltage (e.g., +25 volts) for kinescope 16 when the supply voltage (e.g., +225 volts) is present and for producing a negative grid cut off bias pulse (e.g., −175 volts) at the output terminal 52 upon termination of the supply voltage for blanking the kinescope 16 thereby providing spot burn protection. To this end, control circuit 50 includes a potential divider comprising resistors 54 and 55 coupled between the input terminal 51 and a source 56 of ground reference potential and having an output 57 for providing the given positive grid bias voltage when the supply voltage is present and a ground level voltage upon termination of the supply voltage. Also included is a PNP transistor 60 having a conduction path coupled between the output 57 of the potential divider (54,55) and the output terminal 52 of the grid bias control circuit 50. The transistor 60, in this embodiment of the invention, has a control electrode (base) coupled to the source of ground potential 56 via a base current limiting resistor 62.

Grid bias control circuit 50 also includes, in this example of the invention, a Zener diode 64 coupled between the output node 57 of the potential divider (54,55) and the source 56 of ground potential. The Zener diode 64 has a break down voltage (e.g., +27 volts) that is greater than the given positive voltage (e.g., +25 volts) produced by the potential divider (54,55) when the supply voltage is present. Circuit 50 further includes a PN diode 66 connected in parallel with the conduction path of PNP transistor 60.

In this specific example of the invention, it is desired to bias the grid G of kinescope 16 at a relatively high positive potential of about 25 volts. For this purpose, the resistors 38, 54 and 55 are selected to provide 25 volts at the potential divider output 57. The Zener diode 64 limits initial surge voltages during charging of capacitor 53 to a slightly higher value (e.g., +27 volts). Advantageously, this prevents over-driving the grid during turn-on. Also, since the Zener diode is non-conductive during normal receiver operation, radio frequency interference (RFI) which otherwise could be caused by the Zener diode is avoided.

In the following discussion of circuit operation it will be assumed initially that the receiver 10 has been off for a sufficient time for leakage currents to completely discharge the grid kicker capacitor 53. Upon turn on of the receiver 10 the high voltage supply applied to terminal 34 will gradually build up to its normal operating potential (e.g., 225 volts is assumed in this example). At the same time the deflection processor 18 will begin to provide sweep signals to the kinescope. Initially, the absence of the sweep signals will be detected by switch control unit 20 which will maintain the power supply switch 30 OFF. However, when the sweep signals reach full value, switch 30 will apply the high voltage (+225V) to the input terminal 51 of grid bias control circuit 50.

The initial grid voltage at output terminal 52 will be zero volts during the foregoing "cold start" condition of the receiver 10. This is because it was assumed that the receiver had been off for a sufficiently long time for capacitor 53 to fully discharge by leakage current flow prior to receiver turn-on. With no charge on capacitor 53 the voltage at output terminal 52 will equal the voltage at the positive plate of capacitor 53 and since the plate is grounded by resistors 54 and 55 when switch 30 is OFF, the output terminal 52 will also be at ground potential.

Continuing now with the "cold start" operating phase, when switch 30 is turned ON as described above in response to the presents of adequate sweep signals, the resistor chain 38,54 and 55 will form a potential divider which has a "transient" operating mode during the time that capacitor 53 charges and has a "steady-state" operating mode when capacitor 53 is fully charged. During the "transient" operating mode charging current flows from input terminal 51 to the positive plate of capacitor 53 via resistor 38 which limits the initial charging current. The remainder of the charging current path comprises transistor 60 and Zener diode 64. Specifically, the positive voltage at input 51 is coupled via capacitor 53 to the collector of transistor 60. Since the base of transistor 60 is coupled to ground via resistor 62, the collector-base junction of transistor 60 is forward biased and the transistor operates in the "so-called" inverted mode of operation conducting the charging current of capacitor 53 to ground via Zener diode 64 which has a break down voltage of about 27 volts (i.e., slightly higher than the desired steady state grid voltage of 25 volts). Diode 66 also aids in the conduction of the charging current and is included in this example of the invention because the current gain of transistor 60 operated in the "inverted" mode (i.e., the collector junction forward biased rather than reverse biased as is done in the normal operating mode) is relatively low as compared with its current gain in the normal mode.

The foregoing charging mode continues until capacitor 53 is sufficiently charged that the voltage across Zener diode 64 drops below 27 volts. At that time charging of capacitor 53 still continues until the negative plate of capacitor 53 equals a potential of about 25 volts. This represents the "stead-state" condition noted above for grid bias control circuit 50. In this condition the grid voltage is determined by the magnitude of the supply voltage applied to input terminal 51 and the potential divider resistors 54 and 55 (plus the resistance of the switch 30). Transistor 60 operates in a saturated mode and so regulates the output voltage at output terminal 52 within about a tenth of a volt of the potential divider voltage (i.e., the node 57 voltage).

Still considering the "steady-state" mode described above, the transistor 60 operates in one of two modes depending upon the direction of leakage current flow from the grid of kinescope 16. In more detail, the grid G of kinescope 16 may be expected to act as either a source or a "sink" of leakage current up to a limit of about 5 micro-Amperes for typical projection tubes. The direction of the leakage current (i.e., I1 or I2 as shown) depends upon a number of factors including the dynamic signal conditions of the kinescope and other factors. It is important for maintaining the grid bias voltage at a constant level (25 volts, steady state) that the capacitor 53 not be either charged or discharged by the kinescope grid leakage current under normal operating conditions. Therefore, transistor 60 is operated, in accordance with an aspect of the invention, as a "bilateral switch", so to speak, by providing both normal and inverted operating modes.

A known technique for preventing build up of leakage current would be to connected a high voltage Zener diode in parallel with capacitor 53. However, such an approach suffers from disadvantages in terms of cost, reliability and radio frequency interference (RFI). In the present invention, if current is flowing into the kinescope grid G (e.g., the current I2 as shown), the transistor 60 operates in a normal PNP manner and current flows from the emitter to the collector. If the current is flowing out of the CRT grid (e.g., the current I1 as shown ), the PNP transistor operates in reverse (the inverted mode) and its base collector junction becomes forward biased and the emitter base junction becomes reverse biased. The emitter and collector, in as sense, exchange or "swap" their normal functions and the transistor conducts current backwards. An increase in the collector voltage of about +0.1 volts is sufficient for forward bias the collector base junction. The kinescope grid voltage rise is thus limited to about 0.1 volts.

Under conditions of scan loss switch control 20 will apply a turn off signal to high voltage switch 30 thereby removing the source of high voltage (supply 40). With no current supplied to the potential divider resistors, the voltage at node 57 will be clamped to ground via resistor 55. This places the positive plate of capacitor 53 at ground and drives the output terminal 52 (and the grid G) to a negative voltage thereby blanking kinescope 16. The magnitude of the negative grid bias thus produced equals the charge on capacitor 53 developed during the steady state operating mode described above. In this condition the collector to base junction of transistor 60 is reverse biased and the base emitter junction is not forward biased. Accordingly, since both junctions are not forward biased transistor 60 is biased OFF and conducts no current. In this condition, there are no discharge paths provided for capacitor 53 other than leakage current provided by the kinescope 16. In practice, using a capacitor value of about 4.7 micro-farads (which is typical as previously discussed) and using exemplary element values of about 15 K-Ohms for resistors 55 and 38 and about 100 K-Ohms for resistors 54 and 62, it was found that capacitor discharge rate due to leakage was much less than a volt per second thus extending the period of time that the grid cut-off pulse can be sustained to several minutes.

Figure 2:
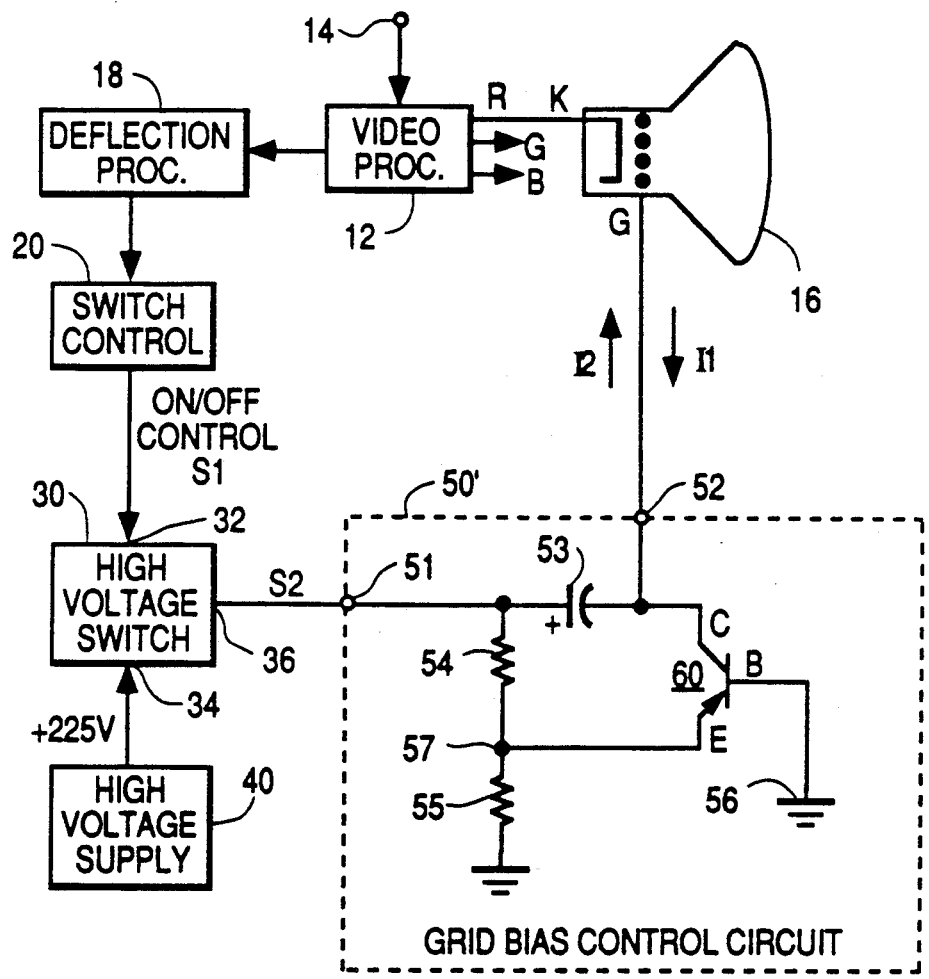
FIG. 2 illustrates a modification of the receiver of FIG. 1 in which the grid bias control circuit is modified for operation at lower positive grid bias voltages.

FIG. 2 illustrates a desirable modification of the receiver 10 of FIG. 1 wherein the grid bias control circuit 50 is modified for operaiton with kinescopes requiring a relative low value of grid bias (e.g., near ground level) during normal operation. The modification comprises removing diodes 66 and 64 and coupling the base of PNP transistor 60 directly to a source of ground reference potential (56). Also, the potential divider resistors 54 and 55 are selected to provide an output voltage at node 57 sufficient to forward bias the base-emitter junction of transistor 60 during normal operation (e.g., about 0.6 volts).

The operation of the modified grid bias control circuit is much the same as that previously described with regard to FIG. 1. One difference, however, is that all of the initial charging current for capacitor 53 flows through the collector-base junction of transistor 60. As a result the voltage at the output 52 never rises above about 0.6 volts during charging thus eliminating the need for the Zener diode D2. Transistor 60 operates as previously described in either the normal or the inverted mode for regulating the output voltage depending on the direction of current flow (I1 or I2) relative to the output terminal 52.

Figure 5:
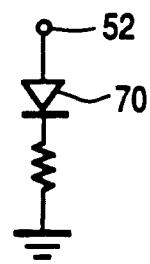

FIG. 5 illustrates a desirable modification of the receiver of FIG. 4 in which the grid bias control circuit 50 is modified to include a further PN diode 70 connected between the output terminal 52 and ground. This diode provides a further path to ground for providing kinescope arc protection and so reduces the voltage stress on transistor 60 under conditions of kinescope arcing.

In the foregoing examples of the invention it has been shown how the potential divider generates the normal grid bias voltage and how this voltage is regulated by transistor 60 in either of the two operating modes "normal" or "inverted". In particular it has been shown that the grid bias control circuit includes no discharge path for the grid kick capacitor 53. Consequently. the negative voltage pulse provided by capacitor 53 exhibits a very long time constant being determined by the value of the capacitor and the value of the leakage current which ultimately will discharge the capacitor. The maximum charge on the capacitor 53 and the maximum potential divider output voltage are influenced, to a certain extent, by the source impedance (e.g., resistor 38) of the high voltage switch 30. Exemplary values for the two embodiments shown are as follows. In the example of FIG. 1: resistors 38 and 55 may be 15 K-Ohms each and resistors 54 and 62 may be 100 k-Ohms each. In the example of FIG. 2 resistor 38 may be 120 K-Ohms, resistor 54 may be 1.1 Meg-Ohms and resistor 55 may be 4.7 K-Ohms. Resistor 38 is not essential in the series switch example but is advantageous in that by adding resistance at this point in the circuit one may limit the maximum charge on capacitor 53 to a desired value. For example, where a kinescope is used with a given maximum grid to cathode voltage (e.g., 400 volts) resistor 38 may be selected to limit the capacitor 53 voltage so that the maximum grid to cathode voltage is within the kinescope rating under the worst case condition where the cathode is driven to the maximum positive value of the high voltage supply and the grid is driven negative. The exemplary values given above are selected to provide a negative grid bias of about 175 volts for a supply of about 225 volts. Accordingly, a kinescope having a 400 volt grid to cathode rating may safely receive 225 volts of cathode drive (positive) and 175 volts of grid drive (negative) with out exceeding the grid to cathode voltage rating of the kinescope. One may readily determine other resistor values for kinescopes having different ratings.

In the examples of the invention herein described a source of switched supply voltage is applied to a potential divider and coupled to an output terminal via a capacitor. An output tap of the potential divider is coupled to the output terminal via the conduction path of a grounded base transistor. In operation the transistor (1) operates in an inverted mode for initially charging the capacitor, (2) operates in either a normal or an inverted mode for regulating a grid bias voltage at said output terminal for grid current flow of either direction relative to the output terminal and (3) operates in an isolation mode upon removal of the switched supply voltage whereby the capacitor applies a negative grid cut-off bias to the output terminal, said transistor in said isolation mode preventing discharge of the capacitor thereby providing a grid cut-off bias at said output terminal having an extended cut-off time constant due to the lack of any discharge path for the capacitor other than leakage.

What is claimed is:

1. A grid bias control circuit for use with a kinescope, comprising:
   an input terminal coupled to a source of switched supply voltage and coupled via a pulse forming capacitor to an output terminal for producing at said output terminal a given positive grid bias voltage for said kinescope when said supply voltage is present and for producing a negative grid cut-off bias pulse at said output terminal upon termination of said supply voltage for blanking said kinescope;
   a potential divider coupled between said input terminal and a source of ground potential and having an output for providing said given positive grid bias voltage when said supply voltage is present and a ground level voltage upon said termination of said supply voltage;
   a transistor having a conduction path coupled between said output of said potential divider and said output terminal of said grid bias control circuit, said transistor having a control electrode coupled to said source of ground potential; and wherein
   said grid bias control circuit having no discharge path, other than leakage paths, for said pulse forming capacitor.

2. A grid bias control circuit as recited in claim 1 for use with a kinescope wherein said given positive grid bias voltage comprises a voltage that is several volts positive with respect to said ground potential, said grid bias control circuit further comprising:
   a Zener diode coupled between said output node of said potential divider and said source of ground potential; and
   a resistor for coupling said electrode of said transistor to said source of ground potential.

3. A grid bias control circuit as recited in claim 2 wherein said Zener diode has a break-down voltage that is greater than said given positive grid bias voltage produced by said potential divider when said supply voltage is present .

4. A grid bias control circuit as recited in claim 3 further comprising a diode coupled in parallel with said conduction path of said transistor.

5. A grid bias control circuit as recited in claim 1 wherein:
   said control electrode of said transistor is coupled to said source of ground potential directly without intervening elements.

6. A grid bias control circuit as recited in claim 5 further comprising a diode connected between said output terminal and said source of ground potential.

* * * * *